(12) United States Patent
Hiner et al.

(10) Patent No.: US 8,167,980 B2
(45) Date of Patent: *May 1, 2012

(54) FILTRATION SYSTEM FOR GAS TURBINES

(75) Inventors: Stephen David Hiner, Salisbury (GB); Rahul Jaikaran Chillar, Marietta, GA (US); Bradly Aaron Kippel, Greer, SC (US); Lisa Kamdar Ammann, Simpsonville, SC (US); Jack Thomas Clements, Lee's Summit, MO (US); Marcus Carr Walters, Ash Green (GB); Sebastien Cloarec, Essert (FR); Marc Malivernay, Valdoie (FR); Liberto Gandia, Brevilliers (FR)

(73) Assignee: General Electric Company, Schenectady, NY (US)

( * ) Notice: Subject to any disclaimer, the term of this patent is extended or adjusted under 35 U.S.C. 154(b) by 745 days.

This patent is subject to a terminal disclaimer.

(21) Appl. No.: 12/200,011

(22) Filed: Aug. 28, 2008

(65) Prior Publication Data

US 2010/0050873 A1    Mar. 4, 2010

(51) Int. Cl.
*B01D 46/00*    (2006.01)

(52) U.S. Cl. ............... 95/268; 95/287; 55/320; 55/327; 55/482; 55/485

(58) Field of Classification Search ........... 95/268, 95/287, 273; 55/302, 306, 324, 327, 332, 55/350.1, 497, 501, 521, 528, 482, 485, 428, 55/495, 511, 462, 465, DIG. 17, DIG. 18; 96/108, 396

See application file for complete search history.

(56) References Cited

U.S. PATENT DOCUMENTS

| | | | | |
|---|---|---|---|---|
| 4,234,323 A | * | 11/1980 | Maher | 95/278 |
| 4,926,620 A | * | 5/1990 | Donle | 95/202 |
| 6,123,751 A | * | 9/2000 | Nelson et al. | 95/268 |
| 6,260,658 B1 | * | 7/2001 | Darrell et al. | 181/224 |
| 6,368,386 B1 | * | 4/2002 | Nelson et al. | 95/268 |
| 6,540,805 B2 | * | 4/2003 | Ohno et al. | 55/486 |
| 6,602,328 B2 | * | 8/2003 | Doi et al. | 95/278 |
| 6,766,636 B2 | * | 7/2004 | Shingu et al. | 60/39.092 |
| 6,833,022 B2 | * | 12/2004 | Feisthammel et al. | 95/91 |
| 6,966,939 B2 | * | 11/2005 | Rammig et al. | 55/486 |

(Continued)

OTHER PUBLICATIONS

General Electric Company; GE Energy Brochure; "AltairSystem2 Filtration System; Offshore/Coastal Protection"; 2007; pp. 1-4.

(Continued)

*Primary Examiner* — Duane Smith
*Assistant Examiner* — Minh-Chau Pham
(74) *Attorney, Agent, or Firm* — Cantor Colburn LLP (57) ABSTRACT

A system for use with an inlet of a gas turbine through which airflow toward the gas turbine proceeds is provided and includes a first stage to remove primary aerosol droplets from the airflow by coalescing the primary aerosol droplets into secondary aerosol droplets, which are larger than the primary aerosol droplets, and to remove solid particulates from the airflow, a second water tight stage, disposed downstream from the first stage, to prevent the secondary aerosol droplets and aqueous solutions of deliquesced particulates, which are not removed by the first stage and which are re-released into the airflow from the first stage, from proceeding along the airflow and to remove solid particulates not removed by the first stage from the airflow, and a third water removal stage, disposed downstream from the second stage, to remove from the airflow the remaining secondary aerosol droplets leaking from the first and second stages.

20 Claims, 6 Drawing Sheets

U.S. PATENT DOCUMENTS

| | | | |
|---|---|---|---|
| 7,340,902 B2 * | 3/2008 | Jimenez Haertel et al. | 60/775 |
| 7,520,137 B2 * | 4/2009 | Hoffmann et al. | 60/775 |
| 7,527,674 B1 * | 5/2009 | Janawitz et al. | 96/57 |
| 7,632,339 B2 * | 12/2009 | Singh | 95/273 |
| 7,648,564 B2 * | 1/2010 | Chillar et al. | 95/273 |
| 7,695,551 B2 * | 4/2010 | Janawitz et al. | 96/66 |
| 7,712,301 B1 * | 5/2010 | Wagner | 60/39.53 |
| 7,832,192 B2 * | 11/2010 | Jimenez Haertel et al. | 60/39.3 |
| 7,846,230 B2 * | 12/2010 | Mei et al. | 55/525 |
| 2003/0010210 A1 * | 1/2003 | Kawano et al. | 95/287 |
| 2003/0084788 A1 * | 5/2003 | Fraser, Jr. | 95/285 |

OTHER PUBLICATIONS

Stephen David Hiner et al.; "Filtration System for Gas Turbines"; filed Aug. 28, 2008; pp. 1-12.

* cited by examiner

FIG. 6

FILTRATION SYSTEM FOR GAS TURBINES

BACKGROUND

Inlet air filtration systems are generally employed for use with gas turbines and operate by removing salt, dust, corrosives and water (hereinafter referred to as "foreign matter") from inlet air in order to prevent their entry into the gas turbine. Foreign matter can enter the gas turbines in various forms, such as solids (i.e., dry salt) or aqueous solutions (i.e., wet salt), and corrode the gas turbine elements. This corrosion could lead to operational inefficiencies or failures and financial losses. As such, it is typically necessary to provide for corrosion mitigation to the gas turbine engine by way of an inlet filtration system that reduces the amount of corrosives entering the gas turbine.

The corrosives can exist in several states which can enter the gas turbine. The first state includes Solid Particulate Corrosive elements. These include salt and oxide particles which can be removed by high efficiency filters. The second state includes Liquid, or, rather, Aqueous Corrosives elements. These include aqueous chlorides or acids, the removal of which cannot generally be efficiently accomplished by particulate filters.

In both cases, the corrosives can be moved along airflow by, typically, two main transfer mechanisms. These include solid salts deposited on particulate filters that can deliquesce when the humidity of ambient air rises beyond about 60% relative humidity (RH) or when filter elements get wet and salts, which are dissolved via rain, fog, mist and other sources of water, enter the inlet air stream. Once salt solutions pass the final filters, there is a potential for the liquid to dry and for salt to precipitate out of solution. This salt precipitate or crystallized salt can now enter the gas turbine.

Current filtration systems available on the market specifically for salt and water removal are generally classified into 3-stage systems and barrier-type systems. The 3-stage systems include a first vane/moisture separator, as a first stage, coalescing filters, as a second stage, and a second vane separator or a water tight high efficiency filter, as a third stage. The coalescing filter captures small salt aerosol droplets and causes them to coalesce into larger droplets and which can then be drained off as salt water. The coalescing filter also removes dust and dry salt particles from the inlet air which may be less than 1 micron in diameter and hydroscopic. The third stage removes any remaining droplets from the airstream, such as droplets that form from dry salt particles filtered by the coalescing filter, which take on water from humid inlet air and which are re-released into the airstream.

In a relatively dry environment in which the 3-stage system is used, a vane separator can be used as final stage, and dry salt particles may accumulate on the rear of the coalescing filter. These dry salt particles can then take on water from the humid inlet air and be re-released into the airstream as droplets that are not large enough to be removed by the second vane separator but which can lead to salt accumulation on the gas turbine elements.

In the barrier-type systems, there are typically two stages of filtration. The first stage is a coalescing pre-filter, which captures and coalesces droplets from the airflow. A large portion of the water drains away, but some is re-released into the airstream. The second, final stage comprises a watertight high efficiency filter, which is watertight and allows air, but not water, to pass through. This captures both dry and wet salt and fine particulate. There is no third stage vane separator within this system.

In practice, barrier-type systems rely on a 100% effectiveness of the filter frame and media seal to prevent salt water proceeding to the gas turbine. This is achievable on new and clean filtration systems on small gas turbines with few filters, but requires maintenance to keep it working properly and becomes impractical to scale on larger machines. Therefore, while the barrier-type system can be effective at stopping the migration of salt toward the gas turbine elements, the primary failure mode is seen as being the sealing mechanism, if installation and maintenance is carried out incorrectly.

BRIEF DESCRIPTION

In accordance with an aspect of the invention, a system for use with an inlet of a gas turbine through which airflow toward the gas turbine proceeds is provided and includes a first stage to remove primary aerosol droplets from the airflow by coalescing the primary aerosol droplets into secondary aerosol droplets, which are larger than the primary aerosol droplets, and to remove solid particulates from the airflow, a second water tight stage, disposed downstream from the first stage, to prevent the secondary aerosol droplets and aqueous solutions of deliquesced particulates, which are not removed by the first stage and which are re-released into the airflow from the first stage, from proceeding along the airflow and to remove solid particulates not removed by the first stage from the airflow, and a third water removal stage, disposed downstream from the second stage, to remove from the airflow the remaining secondary aerosol droplets leaking from the first and second stages.

In accordance with another aspect of the invention, a method of filtering an airflow of inlet air in an inlet housing of a gas turbine is provided and includes, at a first stage, removing primary aerosol droplets from the airflow by coalescing the primary aerosol droplets into secondary aerosol droplets, which are larger than the primary aerosol droplets, and removing solid particulates from the airflow, at a second water tight stage, downstream from the first stage, preventing the secondary aerosol droplets and aqueous solutions of deliquesced particulates, which are not removed by the first stage and which are re-released into the airflow from the first stage, from proceeding along the airflow and removing solid particulates not removed by the first stage from the airflow, and, at a third water removal stage, downstream from the second stage, removing from the airflow the remaining secondary aerosol droplets leaking from the first and second stages.

In accordance with yet another aspect of the invention, a system for use with an inlet of a gas turbine through which airflow toward the gas turbine proceeds is provided and includes a first stage to remove primary aerosol droplets from the airflow by coalescing the primary aerosol droplets into secondary aerosol droplets, which are larger than the primary aerosol droplets, an intermediate stage to remove solid particulates from the airflow, a second water tight stage, disposed downstream from the intermediate stage, to prevent the secondary aerosol droplets and aqueous solutions of deliquesced particulates, which are not removed by the first stage and which are re-released into the airflow from the first stage, from proceeding along the airflow and to remove solid particulates not removed by the first stage from the airflow, and a third water removal stage, disposed downstream from the second stage, to remove from the airflow the remaining secondary aerosol droplets leaking from the first stage, the intermediate stage and the second stage.

BRIEF DESCRIPTION OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

Figure 1:
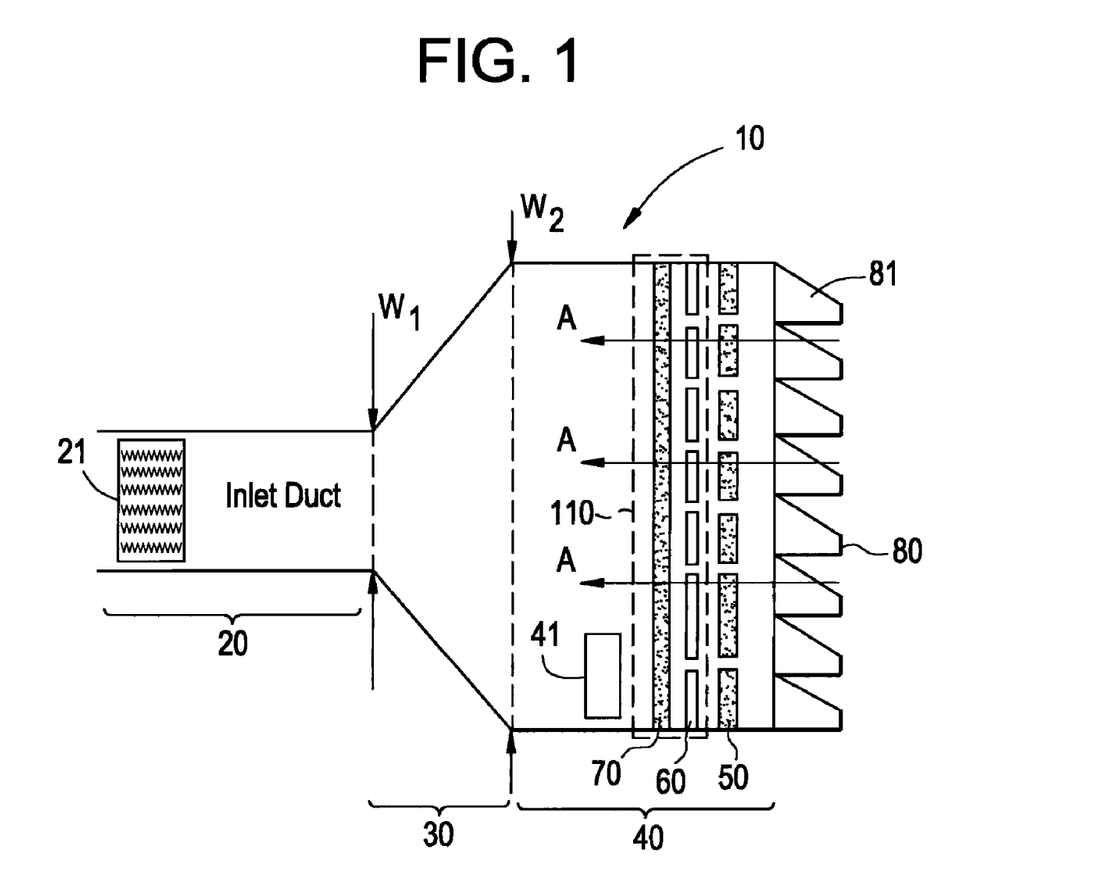
FIG. 1 is a side sectional view of a system for an inlet through which airflow is defined according to an embodiment of the invention.

With reference to FIG. 1, a system 10 for an inlet of, e.g., a gas turbine, is provided. Here the gas turbine may have an approximate air flow range of about 50 Lb/sec to about 2000 Lb/sec in which airflow A proceeds toward the gas turbine at a range of approximate velocities of about 300 ft/min (91 meters/min) to about 3,000 ft/min (914 meters/min). The inlet includes an inlet duct 20 along which the airflow A travels toward elements of the gas turbine, such as the turbine, the compressor and the combustor, to provide for a supply of coolant and combustible air to the gas turbine which is significantly free of particles in a solid state (i.e., dry particles) and aqueous solutions that could lead to an accumulation of corrosive deposits on those elements. A silencer section 21 is disposed within the inlet duct 20 to dampen noise generated within the gas turbine.

The inlet further includes a filter house module 40 and a transition duct 30 disposed between the inlet duct 20 and the filter house module 40. The transition duct 30 has a width W1 where it is fluidly coupled to the inlet duct 20 and a width W2, which may be wider than width W1, where it is fluidly coupled to the filter house module 40.

The filter house module 40 can be embodied as a duct or, more generally, as a duct housing that is fluidly coupled to the transition duct 30 and which serves as an end of the inlet of the system 10. As such, the airflow A initially passes through the filter house module 40 on its way toward the gas turbine elements. The filter house module 40 may be serviced by an operator via access point 41. As shown in FIG. 1, the filter house module 40 further supports at least the first stage 50, the second stage 60 and third stage 70 of the system 10.

The first stage 50 of the system 10 may include a coalescing filter utilizing depth loading media. The first stage 50 has two primary operational modes. In accordance with a first one of these operational modes, the coalescing filter removes relatively small aerosol droplets, such as salt aerosol droplets, from the airflow A and coalesces them into much larger aerosol droplets that may be greater than 20 microns in diameter. This coalescing process allows for drainage of a relatively large portion of liquid, e.g., salt water, rain, fog, mist or condensate, out and away from the airflow A.

In accordance with a second one of the operational modes, the coalescing filter also serves as a pre-filter, an efficiency of which may be such that the coalescing filter captures and/or removes solid coarse particulates having diameters of at least 5 microns from the airflow A. The coalescing filter, therefore, serves to extend a lifecycle of the later stages of the system 10 with the aim of ensuring that a service schedule of the coalescing filter can be coordinated with scheduled shutdowns of the gas turbine. With this said, it is noted that, given its position upstream from the second and third stages 60, 70, the coalescing filter can be serviced with the gas turbine on line.

The coalescing filter of the first stage 50 could be provided as a combined coalescer/pre-filter, as one product, or a separate coalescer and a separate pre-filter, as possible and/or necessary.

Due to the coalescing filter utilizing depth loading media, a risk of the coalescing filter becoming clogged when captured particulates expand due to their taking on water is reduced.

The second stage 60 of the system 10 may include a water tight filter, disposed downstream from the first stage 50, that prevents liquid or aqueous solutions of deliquesced or dissolved particles or dry/solid salt particles from the rear of the coalescing filter of the first stage 50 that have been re-released into the airflow A from the first stage from proceeding along the airflow A and which also removes fine dry/solid particles from the airflow A. To this end, the water tight filter of the second stage 60 may be mounted with, e.g., an oblique angle with respect to a direction of the airflow A, such that a tip thereof points toward the on-coming airflow A. With this configuration, any water or liquid captured by the filter is caused to drain away from the airflow A. Since the second stage 60 is water tight, even if captured particles, such as salt or any other normally hydroscopic particles, deliquesce the newly formed resultant aqueous solution cannot proceed downstream past the water tight filter.

In accordance with embodiments, the filtration efficiency of the water tight filter of the second stage 60 is such that it removes both the fine dust particulates that penetrate the first stage 50 and any fine dry salt particulates in the atmosphere from the airflow A.

In accordance with further embodiments, the water tight filter of the second stage 60 may include fiberglass, or some other suitable filtering material, and may have a coating made from a hydrophobic material, or some other suitable water tight coating material.

The third stage 70 of the system 10 may include a vane separator or, rather, a moisture eliminator, disposed downstream from the second stage 60, that serves to remove droplets from the airflow A and which is virtually 100% efficient at removing droplets larger than 20 microns from the airflow A. The vane separator of the third stage 70 is included in the system 10 to provide an added level of protection for the gas turbine against liquids and/or aqueous solutions leaking past the first and the second stages 50 and 60. For example, the third stage 70 provides for protection in case the second stage 60 fails, if seals and/or gaskets of the second stage 60 fail and/or in a case of an incorrect installation of the second stage 60.

The system 10 may further include a drainage system 110 for use with at least the second and third stages 60 and 70 or, more generally, for use on a clean air side of the inlet. The drainage system 110 allows water to be drained out of the filter house module 40 and away from the second and third stages 60 and 70 while, at the same time, preventing an air bypass and preventing unfiltered air from entering the inlet. In an embodiment, this can be achieved by a loop seal drain or some other suitable system.

In other embodiments, the drainage system 110 may include a baffled drainage box that prevents an occurrence of an air bypass through the drainage system 110. Here, in an example, water from the vane separator of the third stage 70 drains into a top and upstream side of the drainage box which includes a feed water connection point and a control valve that controls a flow rate of the feed water. The vane separator water exits from an upper and downstream side of the drainage box. A baffle separates the upstream from downstream side of the drainage box, is attached to the top of the drainage box and extends downwards therein. A gap at the floor of the drainage box allows the feed water to enter into the downstream side. The drainage box may also be equipped with water level instrumentation that allows the drainage box to be filled with the feed water when/if the water level is near a height of the baffle.

Although it is shown in the figures as being in operational communication with the second and third stages 60 and 70, it is noted that embodiments of the drainage system 110 exist that can provide for drainage of the first stage 50, as described above, and or any other stage/filter disposed within the filter house module 40.

In accordance with additional embodiments, the system 10 may further include a weather hood 80, which is disposed upstream from the first stage 50 to provide for protection of at least the gas turbine and the above-discussed features from rain. The weather hood 80 may itself include individual treatments 81 that can be disposed and/or angled to withstand a relatively large portion of the rain in the atmosphere around the system 10.

Figure 2:
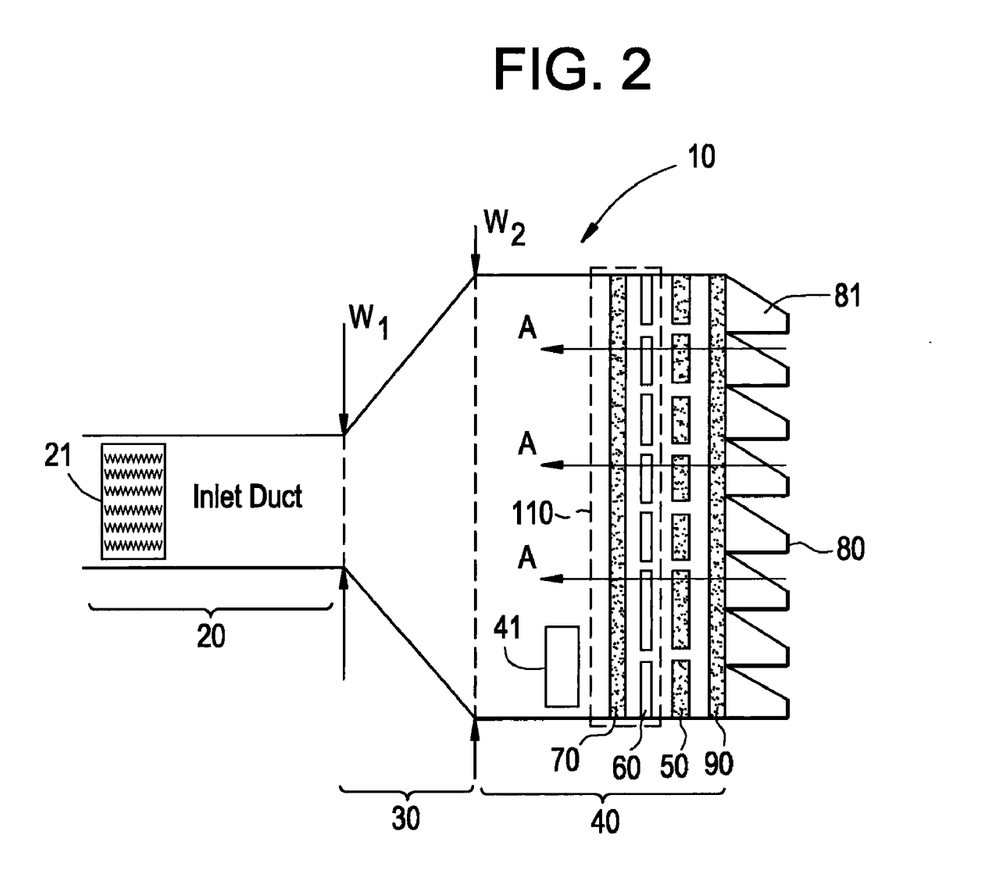
FIG. 2 is a side sectional view of a system for an inlet through which airflow is defined according to another embodiment of the invention.
Figure 3:
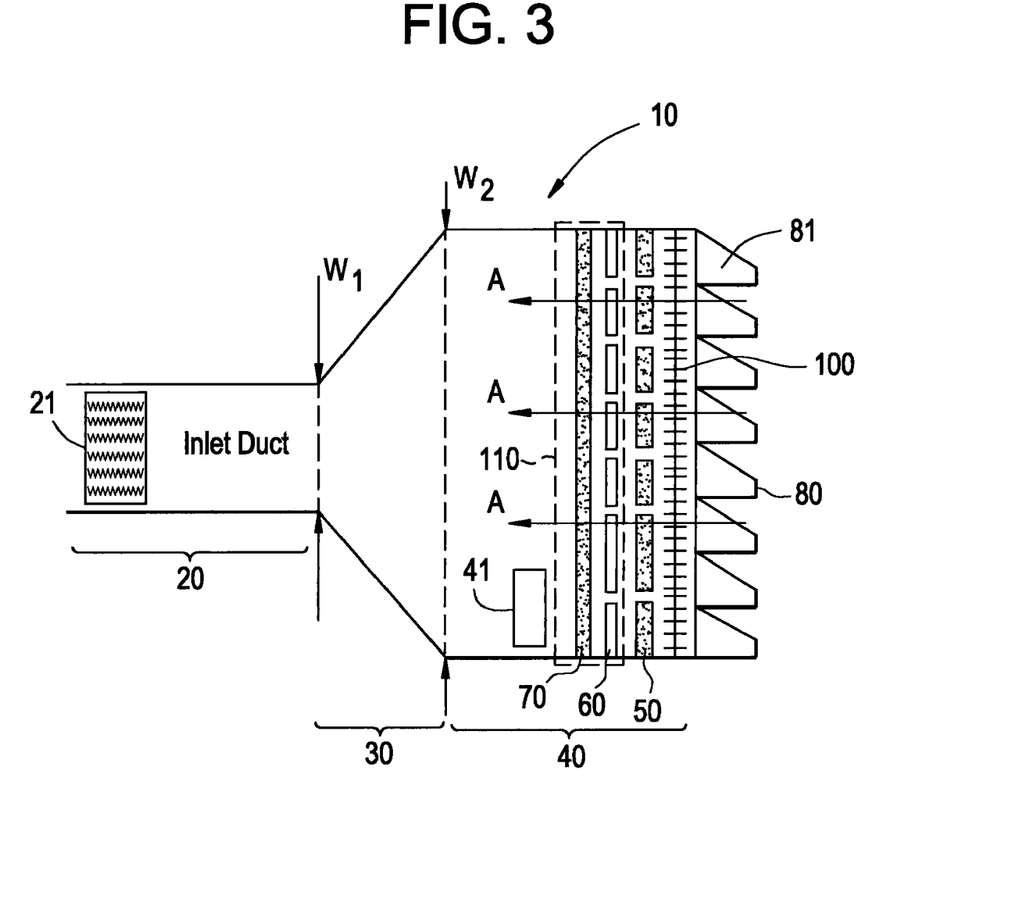
FIG. 3 is a side sectional view of a system for an inlet through which airflow is defined according to another embodiment of the invention.
Figure 4:
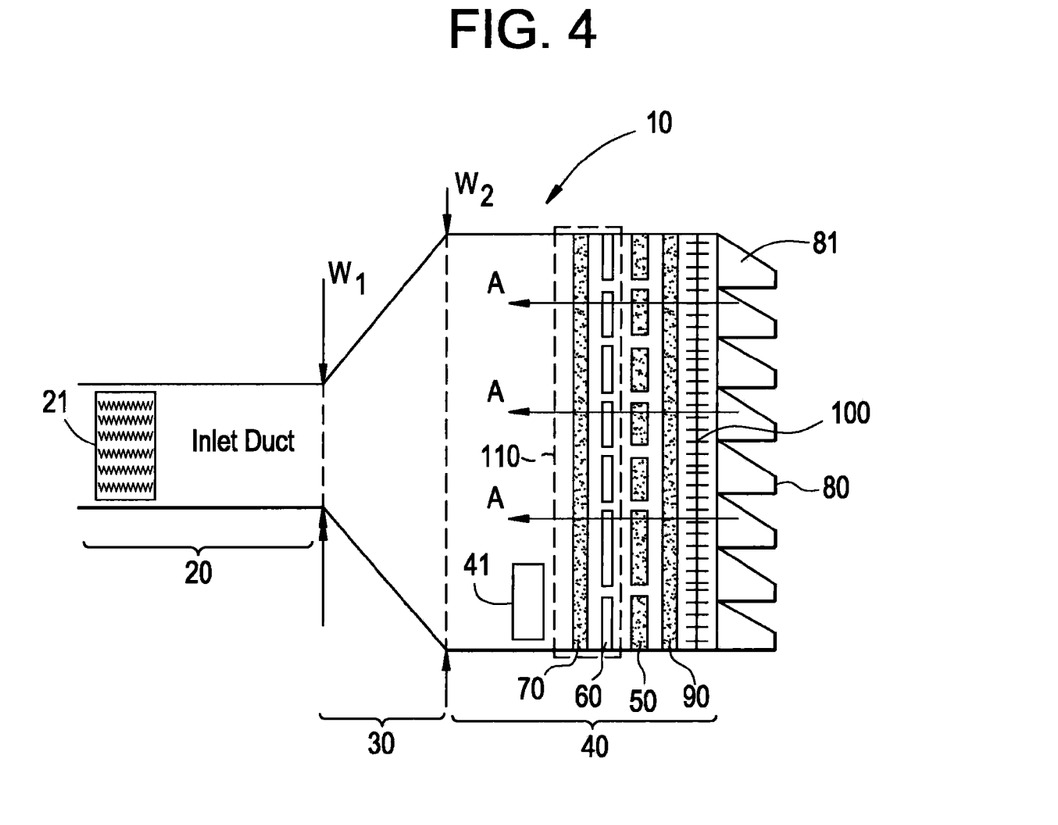
FIG. 4 is a side sectional view of a system for an inlet through which airflow is defined according to another embodiment of the invention.

With reference to FIGS. 2 and 3, it is noted that the system 10 may further alternately include a fourth stage 90, which includes an upstream vane separator to operate in a similar manner as the vane separator of the third stage 70, in environments with high moisture content, or an anti-icing system 100 that prevents the formation of ice on the other filters in cold environments. Such an anti-icing system 100 may include any one or more of a hot water coil, a steam coil or hot compressed air, which is bled from the compressor of the gas turbine. With reference to FIG. 4, it is noted that the fourth stage 90 and the anti-icing system 100 can be employed together with both being disposed upstream from the first stage 50.

Where the first through third stages, 50, 60 and 70 and/or the fourth stage 90 are included in the system 10, it is seen that the combinations of the stages provide for additional resistance to sound waves emanating out of the gas turbine. As such, a proportional decrease in a size of the silencer section 21 of the inlet duct 20 is possible. Thus, a corresponding decrease in manufacturing costs is also possible.

In accordance with various embodiments, spacing between the various stages of the system 10 may be up to, at least, about 30 ft (9.1 meters) to provide for maintenance access and to enable any drops of water to fall onto the walkway of the filter house module 40 and to thereby maximize the water removal efficiency of the system.

Figure 5:
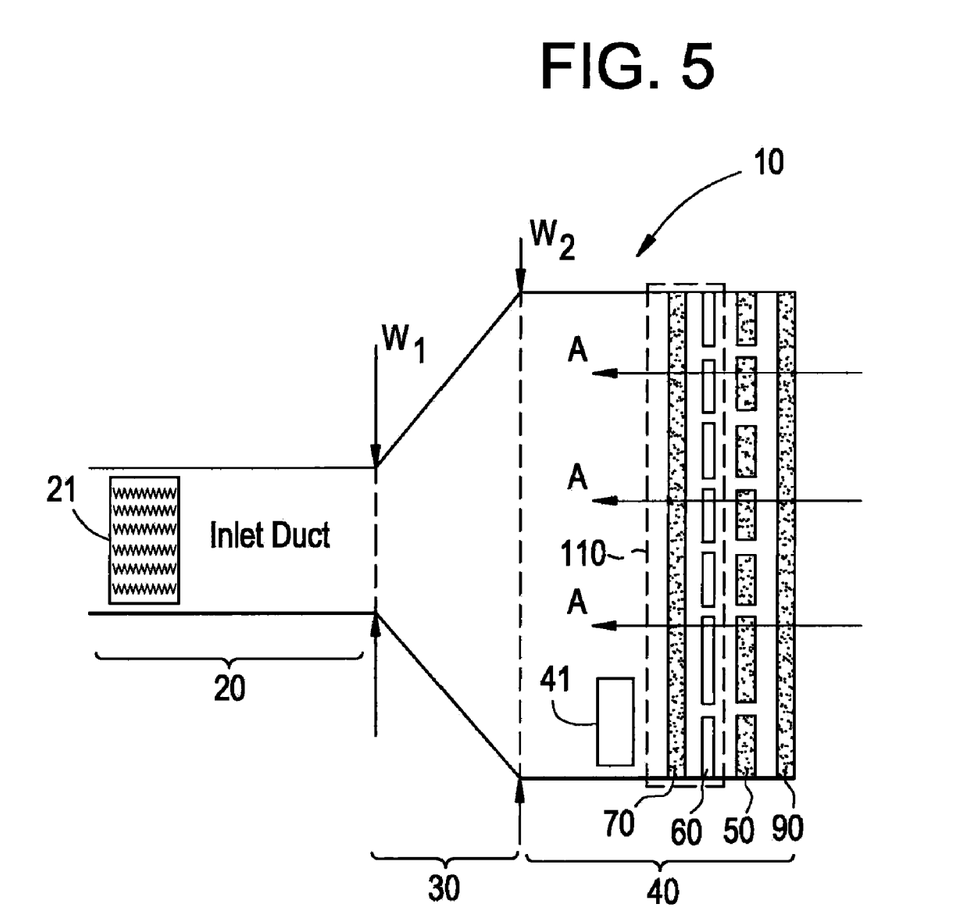
FIG. 5 is a side sectional view of a system for an inlet through which airflow is defined according to another embodiment of the invention.
Figure 6:
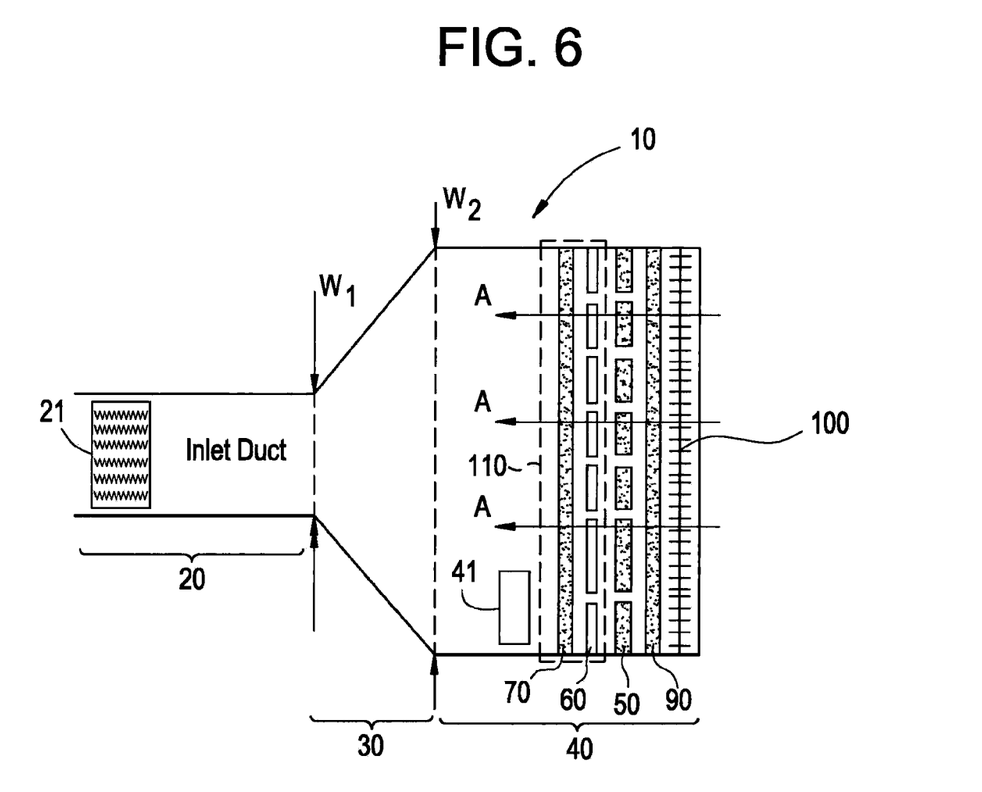
FIG. 6 is a side sectional view of a system for an inlet through which airflow is defined according to another embodiment of the invention.

As shown in FIGS. 5 and 6, the weather hood 80 is optional and need not be included in each configuration. For example, for the configurations shown in FIGS. 5 and 6, where the upstream vane separator of the fourth stage 90 is employed, the upstream vane separator and/or the combination of the upstream vane separator/anti-icing system 100 combination can provide for protection of at least the gas turbine and the above-discussed features from rain.

With reference to FIGS. 1-6, in accordance with another aspect of the invention, a method of filtering an airflow of inlet air in an inlet housing of a gas turbine is provided and includes, at a first stage, removing primary aerosol droplets from the airflow by coalescing the primary aerosol droplets into secondary aerosol droplets, which are larger than the primary aerosol droplets, and removing solid particulates from the airflow, at a second water tight stage, downstream from the first stage, preventing the secondary aerosol droplets and aqueous solutions of deliquesced particulates, which are not removed by the first stage and which are re-released into the airflow from the first stage, from proceeding along the airflow and removing solid particulates not removed by the first stage from the airflow, and, at a third water removal stage, downstream from the second stage, removing from the airflow the remaining secondary aerosol droplets leaking from the first and second stages.

The method may further include angling a weather hood upstream from the first stage to provide for protection from rain, preventing downstream ice formation by an anti-icing system disposed upstream from the first stage, and removing the majority of droplets having diameters greater than 20 microns from the airflow, downstream from the anti-icing system.

The system 10 and methods described herein describe a filter system that is capable of removing both dry and wet salts (as well as other corrosive elements), such as, at least, NaCl, sulphates, and/or other chlorides from the airflow A relatively effectively with a high degree of robustness. As such, the system 10 can be employed for use with gas turbines that are generally land based in coastal locations, inland locations, or locations exposed to high concentrations of corrosive contaminants.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof Therefore, it is intended that the disclosure not be limited to the particular exemplary embodiment disclosed as the best mode contemplated for carrying out this disclosure, but that the disclosure will include all embodiments falling within the scope of the appended claims

The invention claimed is:

1. A system for use with an inlet of a gas turbine through which airflow toward the gas turbine proceeds, the system comprising:
   a first stage to remove primary aerosol droplets from the airflow by coalescing the primary aerosol droplets into secondary aerosol droplets, which are larger than the primary aerosol droplets, and to remove solid particulates from the airflow;
   a second water tight stage, disposed downstream from the first stage, to prevent the secondary aerosol droplets and aqueous solutions of deliquesced particulates, which are not removed by the first stage and which are re-released into the airflow from the first stage, from proceeding along the airflow and to remove solid particulates not removed by the first stage from the airflow; and
   a third water removal stage, disposed downstream from the second stage, to remove from the airflow the remaining secondary aerosol droplets leaking from the first and second stages.

2. The system according to claim 1, wherein the first stage comprises a coalescing filter utilizing depth loading media.

3. The system according to claim 2, wherein the secondary aerosol droplets have diameters of at least 20 microns.

4. The system according to claim 2, wherein the solid particulates removed from the airflow by the first stage have diameters of at least 5 microns.

5. The system according to claim 1, wherein the second stage comprises a water tight filter mounted in the inlet at an oblique angle with respect to a direction of the airflow.

6. The system according to claim 5, wherein the water tight filter comprises fiberglass and/or a hydrophobic coating or layer, which is impermeable to water but allows air to pass through.

7. The system according to claim 1, wherein the remaining secondary aerosol droplets leaking from the first and second stages and removed from the airflow by the third water removal stage have diameters greater than 20 microns.

8. The system according to claim 1, further comprising a weather hood disposed upstream from the first stage to provide for protection from rain.

9. The system according to claim 1, further comprising an anti-icing system, including any one or more of a hot water coil, a steam coil or hot compressed air, disposed upstream from the first stage to prevent downstream ice formation.

10. The system according to claim 9, further comprising an upstream vane separator, disposed downstream from the anti-icing system, to remove a majority of aerosol droplets having diameters greater than 20 microns from the airflow.

11. The system according to claim 1, further comprising an upstream vane separator, disposed upstream from the first stage, to remove aerosol droplets having diameters greater than 20 microns from the airflow.

12. The system according to claim 11, wherein the first through the third stages and the upstream vane separator provide noise attenuation for the gas turbine.

13. The system according to claim 1, wherein the first, second and third stages cooperatively remove at least NaCl, sulphates, and/or chlorides from the airflow.

14. The system according to claim 1, further comprising a drainage system disposed within a clean air side of the inlet to prevent an air bypass therethrough.

15. A method of filtering airflow of inlet air in an inlet housing of a gas turbine, the method comprising:
at a first stage, removing primary aerosol droplets from the airflow by coalescing the primary aerosol droplets into secondary aerosol droplets, which are larger than the primary aerosol droplets, and removing solid particulates from the airflow;
at a second water tight stage, downstream from the first stage, preventing the secondary aerosol droplets and aqueous solutions of deliquesced particulates, which are not removed by the first stage and which are re-released into the airflow from the first stage, from proceeding along the airflow and removing solid particulates not removed by the first stage from the airflow; and
at a third water removal stage, downstream from the second stage, removing from the airflow the remaining secondary aerosol droplets leaking from the first and second stages.

16. The method according to claim 15, further comprising angling a weather hood upstream from the first stage to provide for protection from rain.

17. The system according to claim 15, further comprising preventing downstream ice formation by an anti-icing system disposed upstream from the first stage.

18. The system according to claim 17, further comprising removing a majority of aerosol droplets having diameters greater than 20 microns from the airflow upstream from the anti-icing system.

19. The system according to claim 15, further comprising removing aerosol droplets having diameters greater than 20 microns from the airflow downstream from the first stage.

20. A system for use with an inlet of a gas turbine through which airflow toward the gas turbine proceeds, the system comprising:
a first stage to remove primary aerosol droplets from the airflow by coalescing the primary aerosol droplets into secondary aerosol droplets, which are larger than the primary aerosol droplets;
an intermediate stage to remove solid particulates from the airflow;
a second water tight stage, disposed downstream from the intermediate stage, to prevent the secondary aerosol droplets and aqueous solutions of deliquesced particulates, which are not removed by the first stage and which are re-released into the airflow from the first stage, from proceeding along the airflow and to remove solid particulates not removed by the first stage from the airflow; and
a third water removal stage, disposed downstream from the second stage, to remove from the airflow the remaining secondary aerosol droplets leaking from the first stage, the intermediate stage and the second stage.

* * * * *